July 12, 1949.　　　　　　　　L. MONHEIT　　　　　　　2,476,209
SAFETY RING CLAMP FOR TIRES
Filed June 23, 1947　　　　　　　　　　　　　2 Sheets-Sheet 1
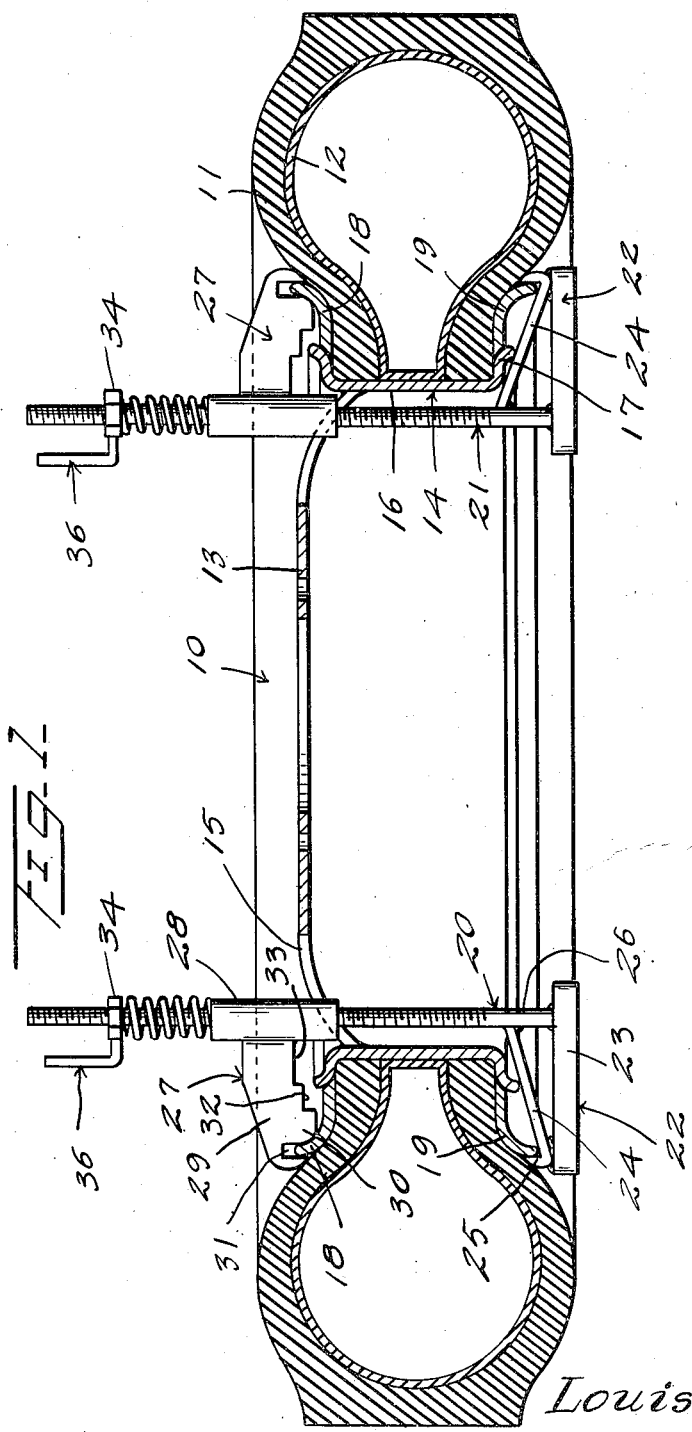
Inventor
Louis Monheit
By Kimmel & Crowell
Attorneys July 12, 1949.    L. MONHEIT    2,476,209
SAFETY RING CLAMP FOR TIRES
Filed June 23, 1947    2 Sheets-Sheet 2
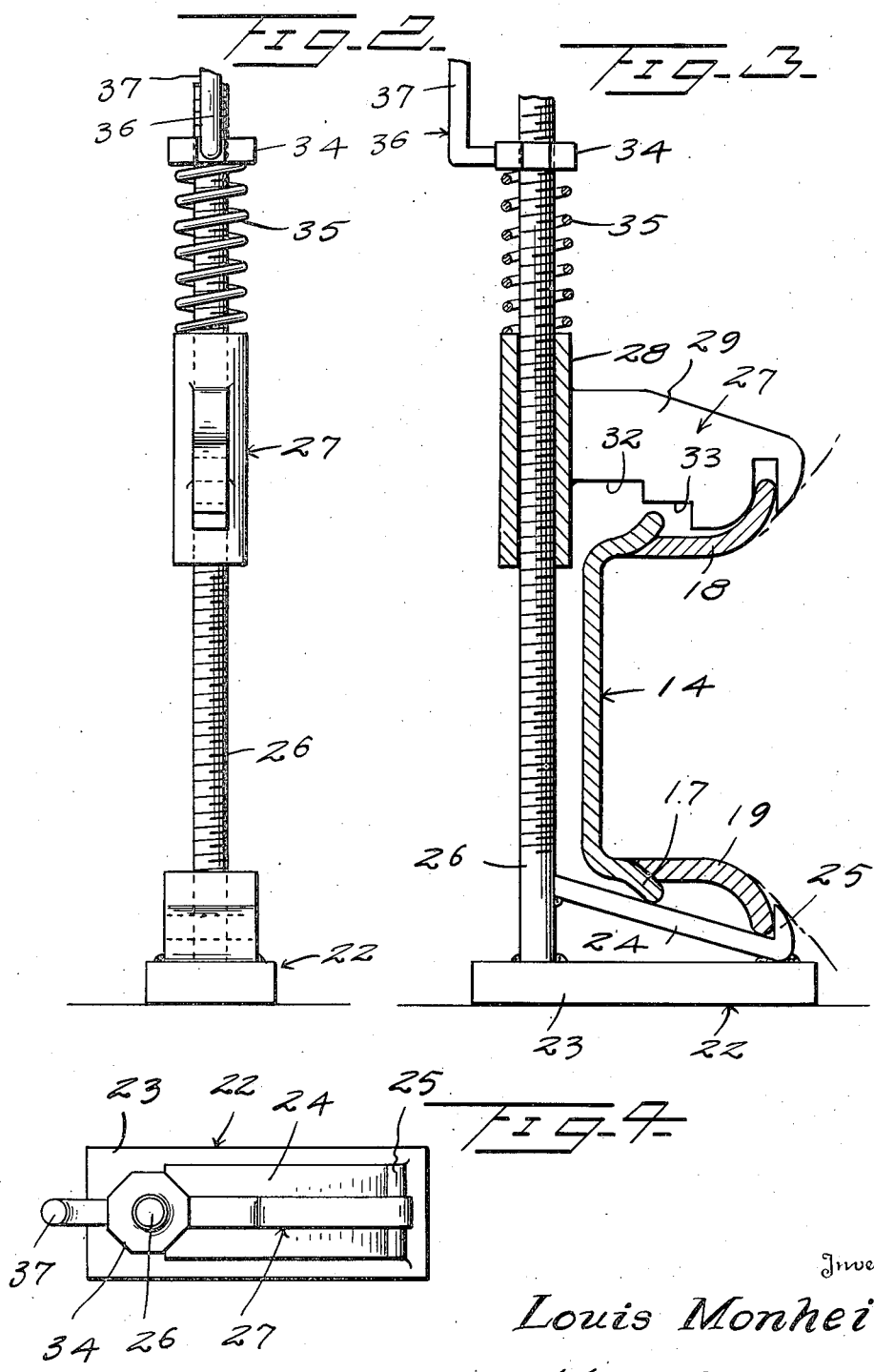
Inventor
Louis Monheit
By Kimmel & Crowell
Attorneys

UNITED STATES PATENT OFFICE 2,476,209

SAFETY RING CLAMP FOR TIRES

Louis Monheit, Atlantic City, N. J.

Application June 23, 1947, Serial No. 756,347

1 Claim. (Cl. 157—1)

This invention relates to a safety clamp for the locking ring of large vehicle tires, and is an improvement over the clamp embodied in my copending application Serial No. 722,436, now abandoned, filed January 16, 1947 for Safety ring lock clamp for tires.

An object of this invention is to provide a ring clamp for firmly holding the locking rings on both sides of large tires during the initial inflation of the tires so that the lock ring will not be forcibly knocked from the rim, as is the case where the ring is not accurately positioned on the rim. It will be understood that with large tires, such as truck tires, the rim has a very small retaining bead in order that the casing may be readily applied on or removed from the rim, and the lock ring must properly engage the rim before inflation of the tire, otherwise the tire will blow out laterally and displace the ring with sufficient force to injure an attendant standing close to the tire.

With a clamp constructed according to this invention, two or more clamps may be secured to the wheel, being extended through the openings in the disk wheel. In the event during the inflation of the tire it should be noted that the lock ring is not accurately positioned, the ring may be hammered or otherwise forced into proper position, and the clamps will retain the ring in its applied position so that the tire may be fully inflated without danger of the ring being blown out and the tire exploding. After the tire has been inflated to the desired pressure the lock ring will be held in position by the tire pressure so that the clamps can then be removed.

In the drawings,

Figure 1 is a transverse section through a tire and wheel having a ring clamping means bounded thereon according to an embodiment of this invention.

Figure 2 is a detailed front elevation on one of the ring clamps.

Figure 3 is a detailed side elevation partly in section, showing the clamp in applied position.

Figure 4 is a top plan of the clamp.

Referring to the drawings, the numeral 10 designates generally a tire including an outer casing 11 and an inner tube 12. The casing and tube are mounted on a rim generally designated as 14 carried by a disc wheel 13. The disc wheel 13 is formed with a plurality of circumferentially spaced openings 15 through which the clamping devices to be hereinafter described are adapted to be extended. The rim 14 includes a substantially cylindrical body 16 which is formed on the opposite edges thereof with a bead 17. In the present instance the bead 17 is shown slightly exaggerated whereas in practice this bead is quite small so that the casing 11 can be slid onto the rim and removed therefrom quite readily when the inner tube is deflated. The casing 11 is adapted to be retained or locked onto the rim 14 by means of a pair of split locking rings 18 and 19. These locking rings 18 and 19 are adapted on the inner circle thereof to engage the beads 17 carried by the rim 14, and when the inner tube 12 is being inflated and after it has been fully inflated the locking rings will be under pressure and will thereby be firmly locked to the beads 17.

In order to provide a means whereby the locking rings 18 and 19 will be firmly held in position the initial inflating of the tire, I have provided at least a pair of clamping devices generally designated as 20 and 21. Where two of these clamping devices are used they are diametrically disposed, but it will be understood that two or more of these devices may be used where considered advisable.

These clamping devices are of like construction and each includes a fixed jaw generally designated as 22 which is formed of base plate 23, an inclined jaw member 24 offset from the inner side of the base member 23 and terminating at its outer end in a hook 25 which is engageable over the outer edge of the ring 19. The base plate 23 has fixed thereto a threaded shaft 26 extending at right angles from the plate 23, and a movable jaw generally designated as 27 loosely engages the threaded shaft 26 and is disposed in confronting position with respect to the fixed jaw 22. The inner end of jaw member 24 is fixed as by welding to the shaft 26. The movable jaw 27 includes a supporting or guiding sleeve 28 which loosely engages about the thread shaft 26 and the sleeve 28 has extending radially therefrom a jaw member 29.

The jaw member 29 is formed on the inner edge thereof with an offset ring engaging part 30 disposed adjacent the outer end of the jaw member 29, and the jaw member 29 is also formed with a notch or recess 31 adjacent its outer end within which the flared outer edge of the ring 18 is adapted to engage. The inner surface of the jaw member 29 is formed with a pair of stepped portions 32 and 33, so that the inner edge of the jaw member 29 will clear the edge of the rim 14 in order that the desired pressure may be applied by the outer jaw portion 30 onto the outer side of the ring 18. A nut 34 is threaded onto the shaft 26 and a spring 35 about shaft 26 is interposed between nut 34 and sleeve 28 so that the desired pressure may be applied to the movable jaw 27 for resiliently holding this jaw and the fixed jaw 22 in clamping position. A handle 36 of L-shape is fixed to nut 34 and has its outer side 37 extending upwardly and parallel with shaft 26.

In the use and operation of these clamping devices, the fixed jaw 22 is initially inserted through the opening or space 15 in the disc 13 and extends to the opposite side of the rim. The hook 25 is engaged over the outer edge of the ring 19, with the ring seated in the angle formed between the hook 25 and the jaw member 24. The shaft 26 will extend through opening 15, as shown in Figure 1, whereupon the movable jaw 27 may be mounted on the shaft 26 and moved inwardly until the outer edge of the ring 18 is seated in the notch 31. The ring engaging portion 30 of the jaw member 29 will engage the concave outer surface of the ring 18 adjacent the outer edge thereof. The nut 34 is then threaded inwardly to apply the desired pressure onto the rings 18 and 19. After two or more of these clamping devices have been applied to the tire, the tire may be inflated, and if during the inflating operation it is found that either ring is not properly seated on its bead 17, the clamping jaws will hold the ring against forcible outward movements. If the ring is not properly seated on the bead 17 during the inflation of the tire, the ring can be seated by hammering or applying desired pressure to the ring in addition to the pressure applied to the ring by the clamping devices. When the tire has been fully inflated the locking rings will be under pressure from the tire and will tightly grip the beads 17 carried by the rim.

With a clamping means as hereinbefore described the attendant inflating a large tire, such as a truck tire or the like, can safely inflate the tire to the desired pressure, and will not be subject to injury as is the case where no clamping devices are used and the locking rings are forced from the rim bead by blowing out or explosion of the tire.

What I claim is:

A safety clamp for the lock ring of tires for holding the ring onto the rim during inflation of the tire, comprising a base, a fixed jaw carried by said base engageable with said ring on one side of the tire, said fixed jaw including a relatively long side inclined to the vertical and a short vertical side, the inclined portion of said fixed jaw being such as to provide for contact of the engaging surface thereof with an edge of the rim and ring, a threaded shaft fixed to said jaw and base and extending right angularly from the latter, said base being relatively long and wide to thereby support said shaft in a vertical position on a plane surface, a movable jaw including a tubular inner portion loosely engaging said shaft, said movable jaw member being formed with an offset convex ring engaging part adjacent the outer end thereof for seating in the concave outer side of the ring, and with a ring retaining hook at the outer end thereof coacting with said offset part to lock said movable jaw relative to the ring, a pressure applying nut threaded on said shaft, and a spring interposed between said nut and said tubular inner portion.

LOUIS MONHEIT.

REFERENCES CITED

The following references are of record in the file of this patent:

UNITED STATES PATENTS

| Number | Name | Date |
|---|---|---|
| 947,811 | Glidden | Feb. 1, 1910 |
| 1,201,778 | Weber | Oct. 17, 1916 |
| 1,349,225 | Rosenblum | Aug. 10, 1920 |
| 1,388,866 | Lambert | Aug. 30, 1921 |
| 1,404,275 | Cowles | Jan. 24, 1922 |
| 1,435,624 | Schwab | Nov. 14, 1922 |
| 1,439,381 | Safstrom | Dec. 19, 1922 |